(12) United States Patent
Koeck et al.

(10) Patent No.: US 11,378,419 B2
(45) Date of Patent: Jul. 5, 2022

(54) ANGLE SENSOR AND METHOD FOR OPERATING AN ANGLE SENSOR

(71) Applicant: Infineon Technologies AG, Neubiberg (DE)

(72) Inventors: Helmut Koeck, Villach (AT); Ahsan Ali, Villach (AT); Torsten Andre, Villach (AT); Johannes Janschitz, Villach (AT)

(73) Assignee: Infineon Technologies AG

( * ) Notice: Subject to any disclaimer, the term of this patent is extended or adjusted under 35 U.S.C. 154(b) by 140 days.

(21) Appl. No.: 16/881,624

(22) Filed: May 22, 2020

(65) Prior Publication Data

US 2020/0378798 A1    Dec. 3, 2020

(30) Foreign Application Priority Data

May 27, 2019 (DE) .......................... 102019114172.9

(51) Int. Cl.
    *G01D 5/14*    (2006.01)
    *G01D 18/00*   (2006.01)
    *G01D 5/16*    (2006.01)

(52) U.S. Cl.
    CPC .............. *G01D 5/145* (2013.01); *G01D 5/16* (2013.01); *G01D 18/00* (2013.01)

(58) Field of Classification Search
    CPC ......... G01D 5/16; G01D 18/00; G01D 18/008
    See application file for complete search history.

(56) References Cited

U.S. PATENT DOCUMENTS

| | | | |
|---|---|---|---|
| 7,203,618 B2 * | 4/2007 | Hammerschmidt | ........................ G01D 5/2448 702/94 |
| 9,746,345 B2 * | 8/2017 | Baumann | ............. G01D 5/2448 |
| 2010/0125430 A1 * | 5/2010 | Kanazawa | ........... G01D 18/001 702/96 |
| 2013/0268234 A1 * | 10/2013 | Janisch | .................... G01B 7/30 702/151 |
| 2017/0315146 A1 * | 11/2017 | Koeck | .................... G01D 5/244 |

FOREIGN PATENT DOCUMENTS

| | | |
|---|---|---|
| DE | 102004024398 A1 | 12/2005 |
| DE | 102015117763 A1 | 4/2016 |

* cited by examiner

*Primary Examiner* — Alvaro E Fortich
(74) *Attorney, Agent, or Firm* — Design IP

(57) ABSTRACT

The present disclosure relates to a design for operating an angle sensor. A first sensor signal is output from a first sensor element on the basis of a magnetic field, which is dependent on an angle of rotation of a measurement object, at the location of the first sensor element. A second sensor signal is output from a second sensor element on the basis of the magnetic field that is dependent on the angle of rotation of the measurement object at the location of the second sensor element. During a calibration mode of the angle sensor, in which a rotation of the measurement object is performed, a first offset value of the first sensor signal, a second offset value of the second sensor signal and an amplitude correction value are determined on the basis of signal amplitudes of the first and second sensor signals. The first and second offset values ascertained during the calibration mode and the amplitude correction value are stored for use in an operating mode of the angle sensor.

20 Claims, 10 Drawing Sheets angle error

|      | -0.75 | -0.5 | -0.25 | 0.0  | 0.25 | 0.5  | 0.75 |
|------|-------|------|-------|------|------|------|------|
| 0.75 | 3.56  | 2.58 | 2.14  | 2.17 | 2.54 | 3.19 | 4.31 |
| 0.5  | 2.48  | 1.63 | 1.13  | 1.14 | 1.52 | 2.07 | 3.13 |
| 0.25 | 1.89  | 1.02 | 0.54  | 0.59 | 0.66 | 1.4  | 2.4  |
| 0.0  | 1.76  | 0.83 | 0.48  | 0.42 | 0.56 | 1.09 | 2.04 |
| -0.25| 2.01  | 1.22 | 0.73  | 0.39 | 0.41 | 1.06 | 2.04 |
| -0.5 | 2.6   | 1.71 | 1.16  | 0.87 | 0.83 | 1.43 | 2.49 |
| -0.75| 3.61  | 2.6  | 2.1   | 1.69 | 1.77 | 2.26 | 3.04 | angle error

|      | -0.75 | -0.5 | -0.25 | 0.0  | 0.25 | 0.5  | 0.75 |
|------|-------|------|-------|------|------|------|------|
| 0.75 | 0.45  | 1.09 | 1.63  | 1.89 | 1.76 | 1.32 | 0.68 |
| 0.5  | 0.8   | 0.36 | 0.71  | 0.94 | 0.78 | 0.4  | 1.11 |
| 0.25 | 1.28  | 0.51 | 0.28  | 0.4  | 0.37 | 0.82 | 1.8  |
| 0.0  | 1.42  | 0.66 | 0.31  | 0.35 | 0.5  | 1.07 | 2.04 |
| -0.25| 1.28  | 0.58 | 0.45  | 0.5  | 0.42 | 0.95 | 1.94 |
| -0.5 | 0.84  | 0.56 | 0.94  | 0.99 | 0.68 | 0.65 | 1.54 |
| -0.75| 0.81  | 1.55 | 1.69  | 1.88 | 1.49 | 0.81 | 1.57 |

ANGLE SENSOR AND METHOD FOR OPERATING AN ANGLE SENSOR

FIELD

The present disclosure relates generally to angle sensors and more particularly to calibrations of angle sensors at the end of a production line using what are known as end-of-line (EoL) calibrations.

BACKGROUND

One of the most important demands on angle sensors today are angle errors and angle accuracy taking into consideration mechanical misalignments. Some causes of a mechanical misalignment are x, y movement between sensor elements and magnet, air gap variation (z movement), inclination of various types (for example package inclination) and/or magnetization inclination.

Horizontal alignment and system inclination (for example package in relation to magnet) are typically the responsibility of a manufacturer of angle sensors. Solid mechanical designs can achieve good accuracy values of approximately +/−300 μm x, y movement and an inclination of approximately 2° today. However, only approximately 3° to 4° of magnetization inclination is normally guaranteed.

To date, one solution for providing an adequate error budget over an entire life, including mechanical loads and temperature influences, is the use of EoL calibration. This frequently involves the use of what are known as multipoint calibration methods, in which deviations from angle estimates of an angle sensor in comparison with multiple known reference angles (sample points) are found and recorded, for example in a lookup table (LUT). Correction values for the angle estimates can then be ascertained therefrom.

Multipoint calibration methods can give rise to additional costs both for a chip manufacturer and for a system manufacturer, however. In order to allow programming of sample points on the chip, an LUT with EEPROM (Electrically Erasable Programmable Read-Only Memory) and other associated functions is required, for example. The more sample points are needed, the greater is the influence on the chip surface area. Investigations show that at least 32 sample points are required for automotive applications in order to achieve an acceptable angle accuracy with multipoint calibration methods. For a system manufacturer, later correction of the angle error requires considerable outlay for the EoL testing and additional costs, since this calibration takes time (360° rotation and comparison with reference, calculation of sample point corrections and write instructions to the chip for storing the calibration settings). The more sample points are programmed, the longer is the programming time.

It is therefore an object of the present disclosure to compensate for mechanical misalignments in angle sensors by means of more efficient EoL calibrations.

SUMMARY

The object is achieved by apparatuses and methods according to the independent claims. Advantageous developments are the subject of the dependent claims.

According to a first aspect of the present disclosure, an angle sensor is provided. The angle sensor includes a first sensor element designed to output a first sensor signal on the basis of a magnetic field, which is dependent on an angle of rotation of a measurement object, at the location of the first sensor element. The angle sensor includes a second sensor element designed to output a second sensor signal on the basis of the magnetic field that is dependent on the angle of rotation of the measurement object at the location of the second sensor element. There is provision for a processor designed for a calibration mode of the angle sensor, in order, for a rotation of the measurement object during the calibration mode, to ascertain a first offset value of the first sensor signal, to ascertain a second offset value of the second sensor signal and to ascertain an amplitude correction value on the basis of signal amplitudes of the first and second sensor signals. Further, the processor is designed to store the first ascertained offset value, the second ascertained offset value and the ascertained amplitude correction value in order to correct a rotation angle estimation in an operating mode of the angle sensor.

The proposed angle sensor thus includes an autocalibration function that can store amplitude and offset compensation parameters permanently and can therefore allow an autocalibration with a special calibration mode that can be carried out as EoL calibration. The angle sensor can thus be put into a dedicated calibration mode. The calibration mode with autocalibration can be applied during an EoL calibration instead of a multipoint calibration and is not intended as in-situ calibration during normal operation (operating mode).

According to some exemplary embodiments, the angle sensor is designed so as, during the calibration mode, to ascertain the first offset value, the second offset value and the amplitude correction value for at least one full 360° rotation of the measurement object (e.g. a shaft). At least one full 360° rotation of the measurement object during the calibration mode can facilitate a determination of respective minimum and maximum of the signal amplitudes of the first and second sensor signals. Embodiments that require less than one 360° rotation of the measurement object during the calibration mode are also conceivable, however. The rotation of the measurement object during the calibration mode should encounter the respective minimum and maximum of the signal amplitudes of the first and second sensor signals where possible, however.

According to some exemplary embodiments, the angle sensor further includes a nonvolatile memory designed to store the first and second offset values ascertained by the processor during the calibration mode and the amplitude correction value for a subsequent application in the (normal) operating mode. According to some exemplary embodiments, the angle sensor can be integrated on a semiconductor chip, and the chip can include a nonvolatile memory for the first and second offset values and the amplitude correction value. Examples of nonvolatile semiconductor memories are EPROM and flash memory. It is therefore possible, during normal operation in the operating mode, for a rotation angle estimation to be performed on the basis of currently measured sensor signals and the compensation values ascertained and stored during the calibration mode.

According to some exemplary embodiments, the first and second sensor elements are each in the form of a magnetic field sensor element. Examples of magnetic field sensor elements are Hall sensor elements (lateral or vertical Hall sensor elements) or magnetoresistive (XMR) sensor elements. Embodiments in which the first and second sensor elements are each in the form of inductive sensor elements are also conceivable. A fundamental principle of inductive sensors is a change in the inductance or in the quality thereof as a result of a change of position relative to a conductive and/or ferromagnetic part.

According to some exemplary embodiments, the first and second sensor elements are designed so as, in response to the magnetic field that is dependent on the angle of rotation of the measurement object at the location of the respective sensor element, to output sensor signals phase-shifted through substantially 90°. It will be apparent to a person skilled in the art that sensor signals phase-shifted through exactly 90° is the ideal, which is never entirely achieved in practice on account of production tolerances and attendant mechanical misalignments.

To obtain sensor signals phase-shifted through substantially 90°, it is possible, according to some exemplary embodiments, for the first sensor element to be sensitive to a first direction component (e.g. x direction) of the magnetic field and for the second sensor element to be sensitive to a second direction component (e.g. y direction) of the magnetic field, the second direction component being perpendicular to the first direction component. Such embodiments can be realized by means of XMR sensor elements (e.g. GMR, TMR, AMR), for example. According to other exemplary embodiments, both the first and the second sensor element can be sensitive to the same direction component (e.g. z direction) of the magnetic field. The 90° phase shift between the first and second sensor signals can then be set by the respective placements of the first and second sensor elements.

Without mechanical misalignments between sensor elements and measurement object, the first and second sensor signals would ideally each have a mean value of zero for a 360° rotation of the measurement object during the calibration mode. Actually, existing mechanical misalignments each lead to a mean value unequal to zero, however. The first and second offset values thus indicate a respective actual mean-value deviation from zero. Further, without mechanical misalignments, the first and second sensor signals would ideally have identical signal amplitudes. Actually, existing mechanical misalignments lead to unequal signal amplitudes of the two sensor signals, however. The amplitude correction value corresponds, according to some exemplary embodiments, to a ratio of the signal amplitudes of the first and second sensor signals. Signal amplitude is understood below to mean a difference between the minimum and maximum of the respective sensor signal.

According to some exemplary embodiments, the processor is designed so as, during an operating mode of the angle sensor (after the initial calibration mode), for rotations of the measurement object in a rotation angle range of less than 360°, to ascertain an angle of rotation AE on the basis of the first and second sensor signals, the first and second offset values and/or the amplitude correction value.

According to some exemplary embodiments, the processor is designed to ascertain the angle of rotation AE on the basis of AE=atan(ADC1−Off1;[ADC2−Off2]*mm), where ADC1 signifies the first (digitized) sensor signal, ADC2 signifies the second (digitized) sensor signal, Off1 signifies the first offset value, Off2 signifies the second offset value and mm signifies the amplitude correction value. In this case, Offx (x=1, 2) can correspond for example to Offx=1/2(ADCx_max+ADCx_min)

and mm can correspond for example to $$mm = \frac{ADC1_{max} - ADC1\_min}{ADC2_{max} - ADC2\_min}.$$

According to some exemplary embodiments, the processor is designed so as, during the calibration mode of the angle sensor, for predetermined reference rotation angles (sample points) of a multipoint calibration method, to ascertain a respective rotation angle estimation for the measurement object on the basis of the first and second sensor signals, the first and second offset values and/or the amplitude correction value, and to store a difference between respective rotation angle estimation and reference rotation angle as angle correction value. The proposed EoL autocalibration can optionally thus also be combined with a multipoint calibration in order to increase an estimation accuracy further still. Accordingly, the processor can be designed so as, during the normal operating mode of the angle sensor, for rotations of the measurement object in a rotation angle range of less than 360°, to ascertain a first rotation angle estimation on the basis of the first and second sensor signals, the first and second offset values and/or the amplitude correction value and to ascertain a second rotation angle estimation on the basis of the first rotation angle estimation and at least one angle correction value of the multipoint calibration.

According to a further aspect of the present disclosure, a method for operating an angle sensor is proposed. The method includes outputting a first sensor signal from a first sensor element on the basis of a magnetic field, which is dependent on an angle of rotation of a measurement object, at the location of the first sensor element and outputting a second sensor signal from a second sensor element on the basis of the magnetic field that is dependent on the angle of rotation of the measurement object at the location of the second sensor element. During a calibration mode of the angle sensor, a rotation of the measurement object is performed and a first offset value of the first sensor signal, a second offset value of the second sensor signal and an amplitude correction value are ascertained on the basis of signal amplitudes of the first and second sensor signals. In the calibration mode, the first and second offset values and the amplitude correction value are stored for a later application in an operating mode of the angle sensor.

For an EoL calibration, it is thus possible to switch to the calibration mode. Measurement is then performed in the calibration mode, so that the offset values and the amplitude correction value can be determined. The ascertained values can be stored in a (non-volatile) memory. The calibration mode can be performed once after installation of the angle sensor in an installation environment, for example. After performance of the calibration mode, the angle sensor can be operated in the operating mode.

According to some exemplary embodiments, during the calibration mode, the first offset value, the second offset value and the amplitude correction value are ascertained for at least one 360° rotation of the measurement object. At least one full 360° rotation of the measurement object during the calibration mode can facilitate a determination of the respective minimum and maximum of the signal amplitudes of the first and second sensor signals.

According to some exemplary embodiments, the method further includes an operating mode of the angle sensor that is subsequent to the calibration mode and in which rotations of the measurement object of less than 360° are performed. In the operating mode, a rotation angle estimation is ascertained on the basis of the first and second sensor signals, the stored first and second offset values and the stored amplitude correction value.

After the calibration mode, it is thus possible to change to the normal operating mode. The offset values and amplitude correction value ascertained in the calibration mode can then be applied to the measured sensor signals in order to obtain a corrected rotation angle estimation.

According to some exemplary embodiments, during the calibration mode, for predetermined reference rotation angles (sample points), a respective rotation angle estimation for the measurement object can be ascertained on the basis of the first and second sensor signals, the first and second offset values and the amplitude correction value, and additionally a difference between the respective rotation angle estimation and the reference rotation angle can be stored as angle correction value. The proposed EoL autocalibration can thus also be combined with a multipoint calibration for predetermined reference rotation angles, in order to increase an estimation accuracy further still. Accordingly, during the operating mode of the angle sensor, for rotations of the measurement object in a rotation angle range of less than 360°, a first rotation angle estimation can be ascertained on the basis of the first and second sensor signals, the stored first and second offset values and/or the stored amplitude correction value and a second rotation angle estimation can be ascertained on the basis of the first rotation angle estimation and at least one stored angle correction value.

Exemplary embodiments of the present disclosure thus relate to an autocalibration function applied once with preferably full rotation of the measurement object. This allows a simple amplitude and offset correction to be achieved for a typical EoL calibration without an external reference. Further, a calibration/initial programming process on a process line of a system manufacturer can be speeded up. The function itself can easily be implemented and, in combination with multipoint calibration functions, can even improve the angle performance or provide the potential to dispense with multipoint calibration functions and thus save chip surface area.

BRIEF DESCRIPTION OF THE DRAWINGS

A few examples of apparatuses and/or methods are explained in more detail below, merely in exemplary fashion, with reference to the accompanying figures, in which.

DETAILED DESCRIPTION

Various examples will now be described more thoroughly with reference to the accompanying figures, which illustrate some examples. In the figures, the thicknesses of lines, layers and/or regions may be exaggerated for clarification purposes.

While further examples are suitable for various modifications and alternative forms, some specific examples thereof are accordingly shown in the figures and are described thoroughly below. However, this detailed description does not restrict further examples to the specific forms described. Further examples can cover all modifications, counterparts and alternatives that fall within the scope of the disclosure. Throughout the description of the figures, identical or similar reference signs refer to identical or similar elements that can be implemented identically or in modified form in a comparison with one another, while they provide the same or a similar function.

It goes without saying that if one element is designated as "connected" or "coupled" to another element, the elements can be connected or coupled directly or via one or more intermediate elements. If two elements A and B are combined using an "or", this should be understood to mean that all possible combinations are disclosed, i.e. only A, only B, and A and B, unless explicitly or implicitly defined otherwise. An alternative wording for the same combinations is "at least one from A and B" or "A and/or B". The same applies, mutatis mutandis, to combinations of more than two elements.

The terminology used here to describe specific examples is not intended to have a limiting effect for further examples. When a singular form, e.g. "a, an" and "the" is used, and the use of only a single element is defined neither explicitly nor implicitly as obligatory, further examples can also use plural elements in order to implement the same function. If a function is described below as implemented using multiple elements, further examples can implement the same function using a single element or a single processing entity. Furthermore, it goes without saying that the terms "comprises", "comprising", "has" and/or "having" in their usage make more precise the presence of the indicated features, integers, steps, operations, processes, elements, components and/or a group thereof, but do not exclude the presence or addition of one or more other features, integers, steps, operations, processes, elements, components and/or a group thereof.

Unless defined otherwise, all terms (including technical and scientific terms) are used here in their customary meaning in the field with which examples are associated.

As already mentioned at the outset, possible causes of a mechanical misalignment are x, y movements between sensor elements and magnet, air gap variation (z movement), inclination of various types (for example package inclination) and/or magnetization inclination.

Figure 1A:
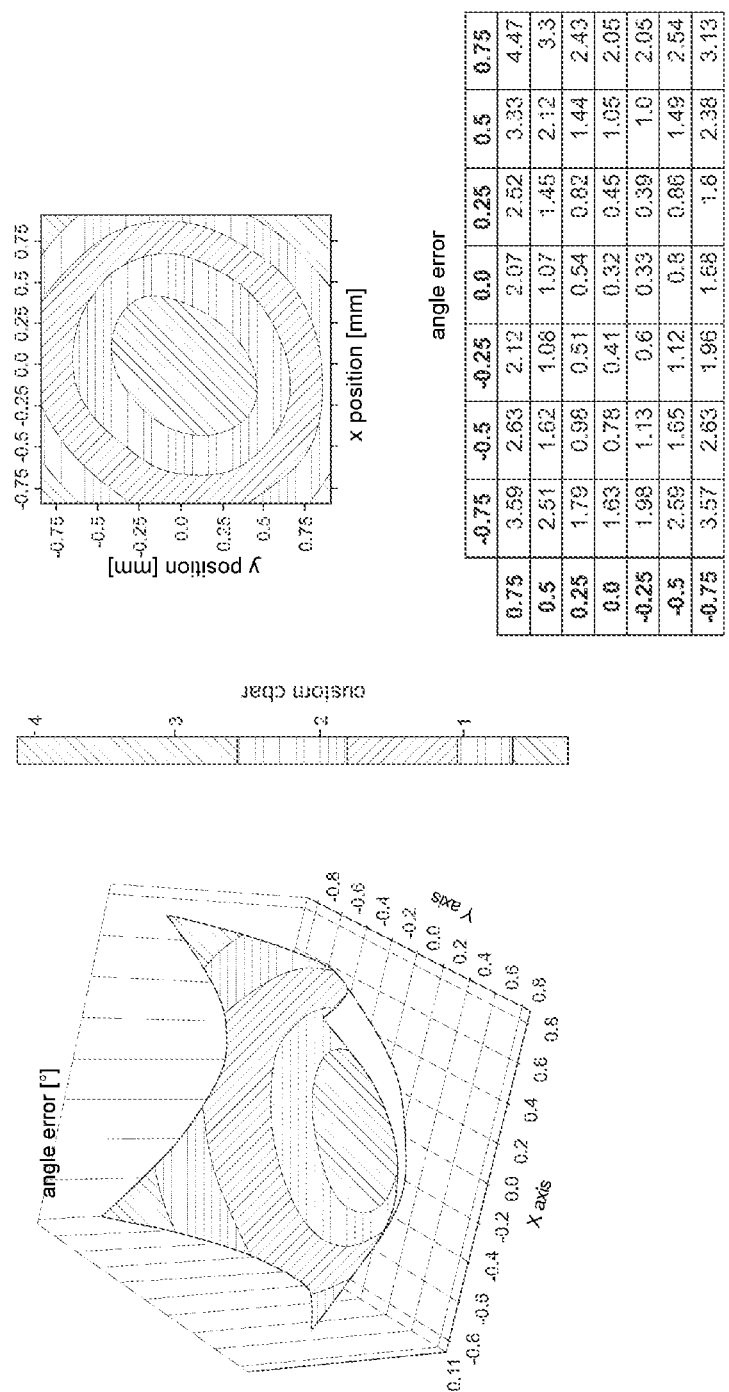
FIG. 1A shows an angle error distribution for a differential angle sensor with a reading radius of 1 mm for an air gap of 1.7 mm and room temperature conditions in front of a typical magnetic target having a diameter of 6 mm and perfect magnet inclination close to 0°.

In this regard, FIG. 1A shows an exemplary angle error distribution along an x and y movement. FIG. 1A shows an example of a relatively good sensor-magnet alignment. This becomes clear from the local minimum of the angle error close to the (0/0) position and peak error values at corresponding corners (0.8/0.8) or (−0.8/−0.8). Such results can be achieved with additional support from optical alignment devices and multiple measurements on a special laboratory test bench, for example. Such perfect alignment is generally not possible at the location of installation of a system with an angle sensor and a measurement object, however.

Figure 1B:
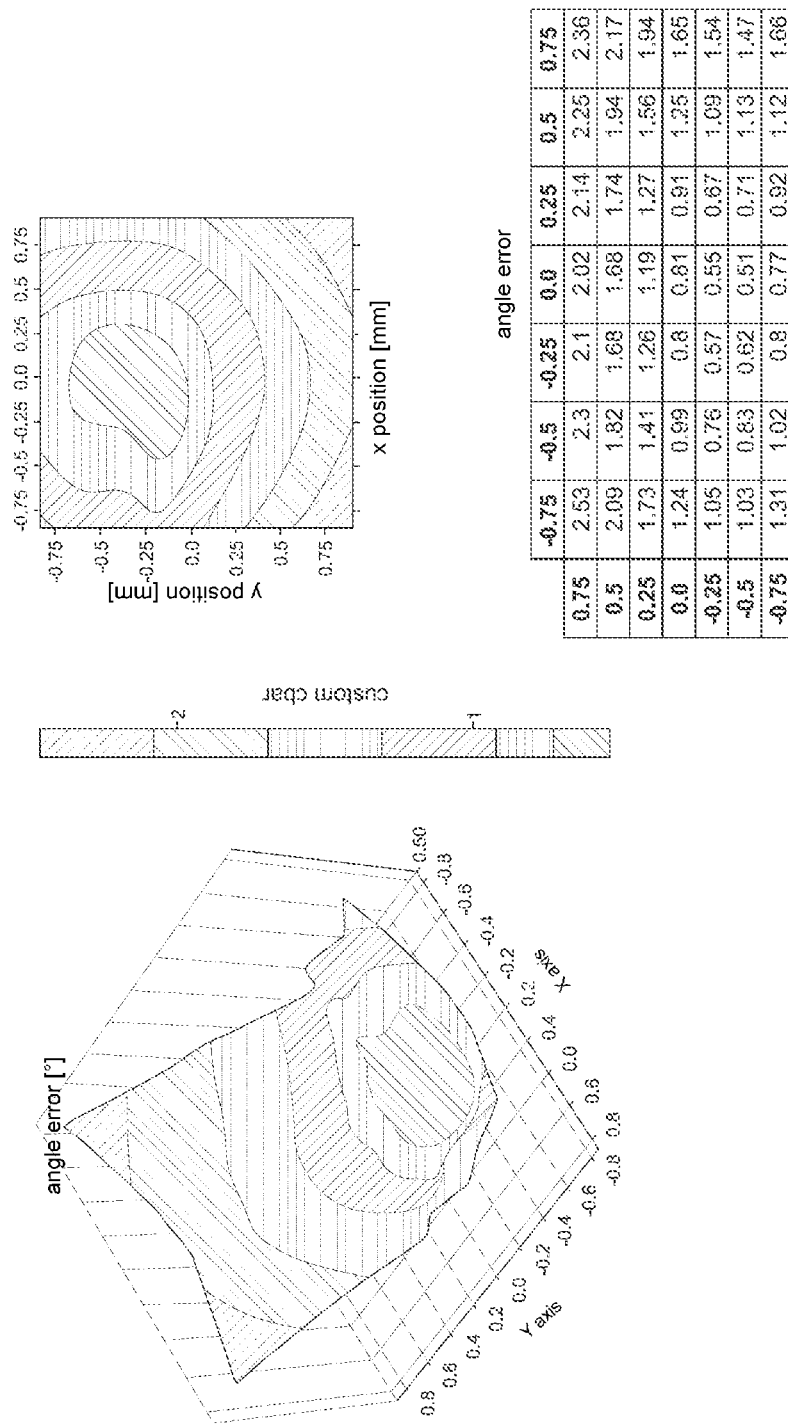
FIG. 1B shows an angle error distribution for a typical measurement in front of the reference magnet in the case of eccentric alignment.

FIG. 1B shows an angle error distribution for a typical measurement in front of a reference magnet in the case of eccentric alignment. The results depicted in FIG. 1B are a known problem for gradient-based angle sensors. The use of gradient-based angle sensors, that is to say differential angle sensors, can offer robustness in a stray field. A differential sensor design allows homogeneous stray fields to be equalized, but on the other hand makes the sensor more sensitive toward mechanical misalignments.

Figure 2A:
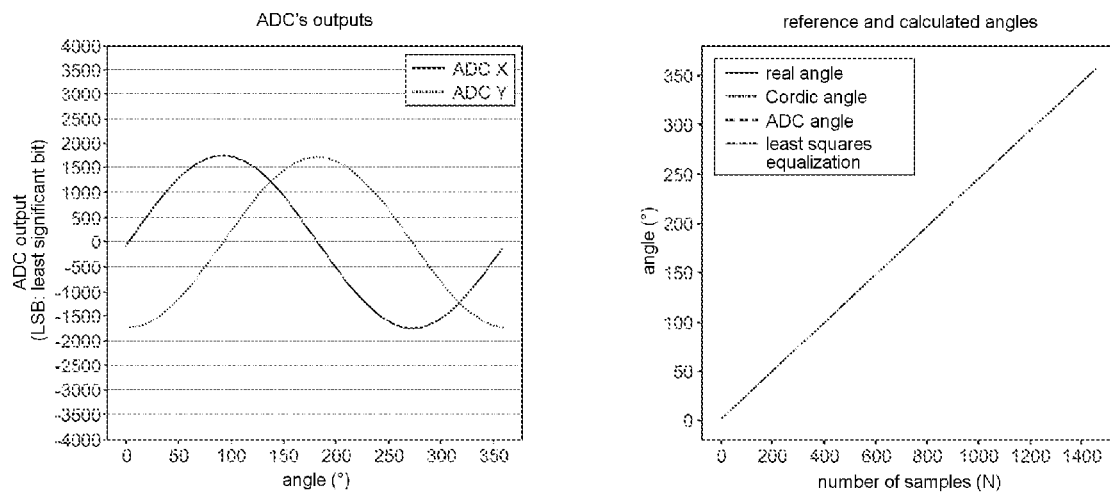
FIG. 2A shows ADC output signals for a typical measurement in front of the reference magnet with almost ideal centering and a consequently almost perfectly calculated angular linearity.

FIG. 2A shows, on the left, a signal characteristic for analog-to-digital converter (ADC) output signals from a differential angle sensor with x and y channels for a typical measurement in front of a reference magnet with almost ideal centering. The signal amplitudes of the differential x and y signals are almost identical and a phase offset of the differential x and y signals is almost 90°. This results in an almost perfect calculated angular linearity (on the right).

Figure 2B:
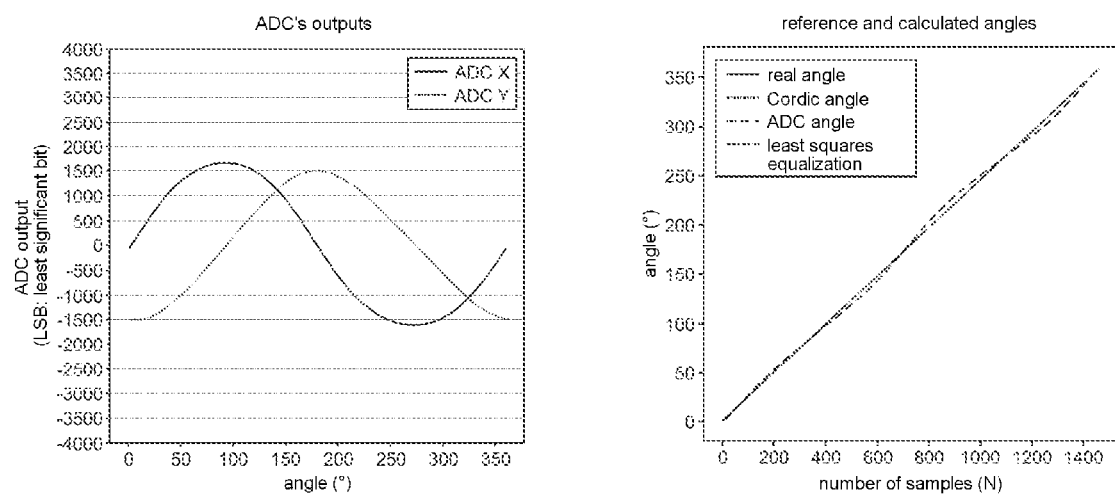
FIG. 2B shows ADC output signals for a typical measurement in front of the reference magnet with a substantial deviation from the central alignment and a resultant angular nonlinearity.

By contrast, FIG. 2B shows (on the left) ADC output signals for a typical measurement in front of a reference magnet with a substantial deviation from the central alignment (x movement=1.2 mm and y movement=−1.2 mm). This misalignment results in a significant signal amplitude mismatch, so that a resultant angular nonlinearity for a calculated angle comparison is clearly visible in the figure on the right.

Figure 3A:
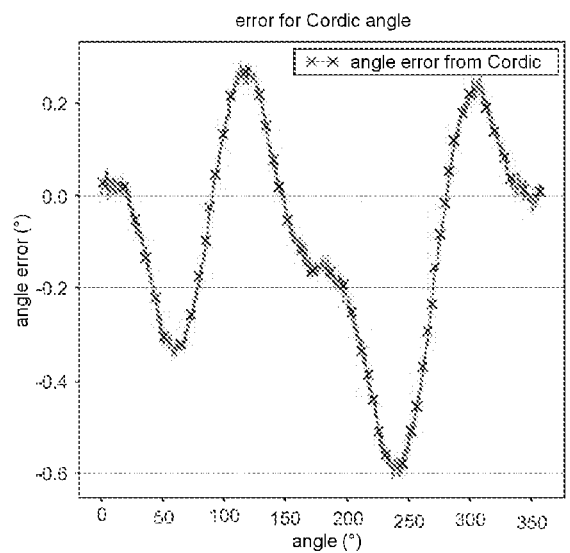
FIGS. 3A and 3B show angle error comparison for the central alignment and the corner alignment.
Figure 3B:
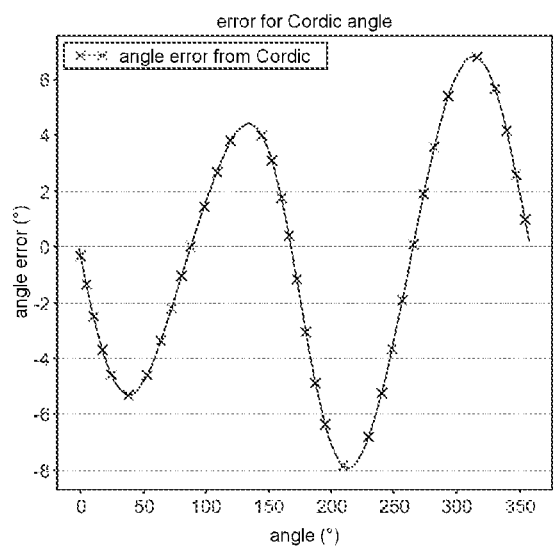

FIGS. 3A and 3B show an angle error comparison for the central alignment (0/0) (FIG. 3A) with the corner alignment (1.2/−1.2) (FIG. 3B). Note the different y axis scales with a maximum angle error (AE) for the central alignment below 0.6° and errors larger by more than a factor of 10 for the incorrectly aligned example. This clarifies the need to compensate for such types of causes of error. Typically, this is accomplished by using what are known as EoL multipoint calibrations. This involves a respective (erroneous) angle estimation being performed for multiple known reference rotation angles or sample points. A difference between the respective angle estimation and the reference rotation angle can be stored as angle correction value. As was already mentioned at the outset, multipoint calibration methods can give rise to additional costs both for a chip manufacturer and for a system manufacturer.

The present disclosure therefore proposes equalizing mechanical misalignments by using an integrated autocalibration, which, owing to on-chip parameter storage, can first be performed in an EoL calibration mode and then applied during normal operation.

Figure 4:
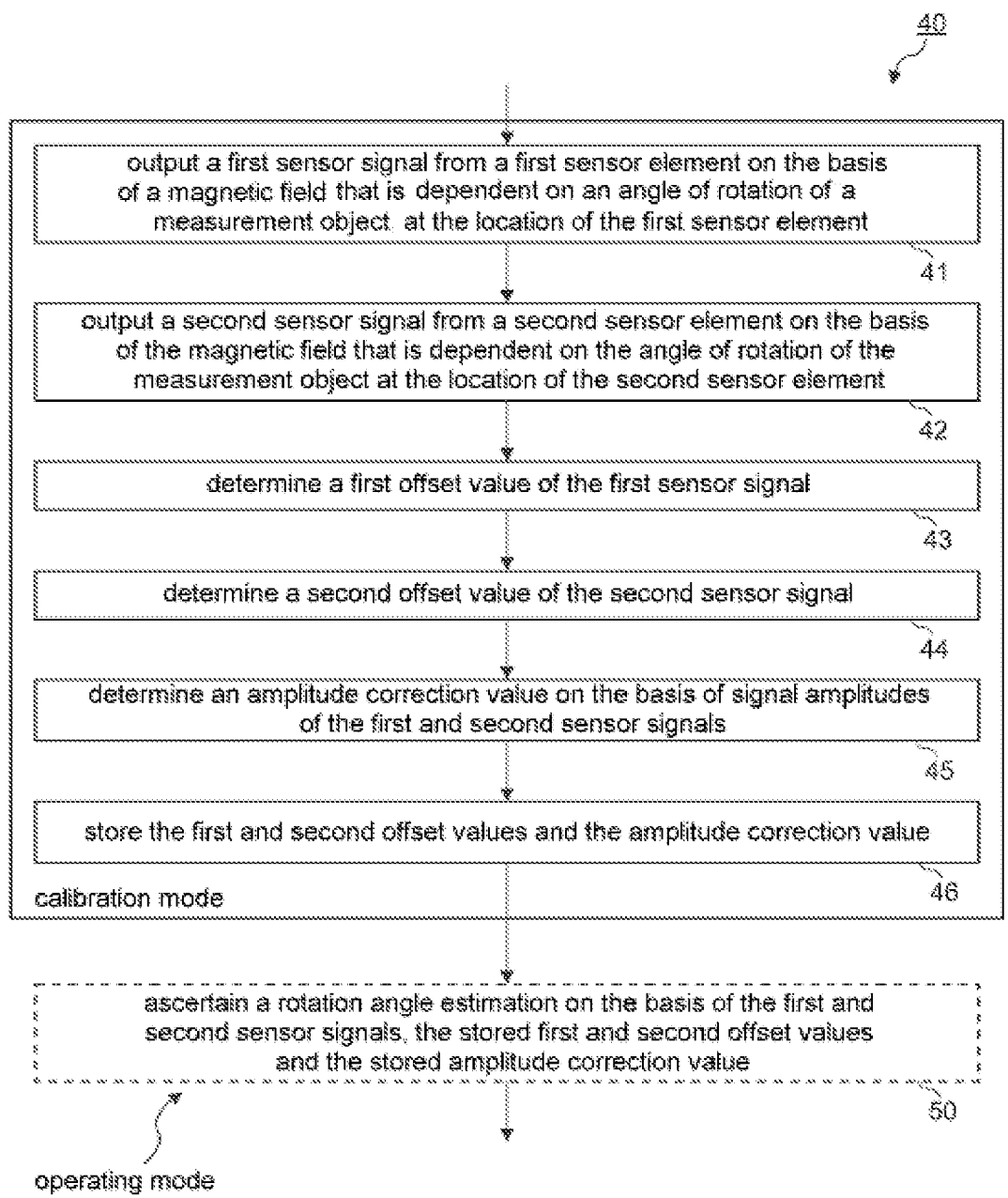
FIG. 4 shows a flowchart for a method for operating an angle sensor according to an exemplary embodiment.

In this regard, FIG. 4 shows a flowchart for a method 40 for operating a differential angle sensor according to an exemplary embodiment of the present disclosure. The method 40 relates to an EoL calibration mode of the angle sensor, during which a rotation of the measurement object is performed. The rotation is preferably but not necessarily at least one full 360° rotation of the measurement object, such as e.g. a shaft, a wheel or another angle transmitter.

First, a first sensor signal is output from a first sensor element on the basis of a magnetic field, which is dependent on an angle of rotation of a measurement object, at the location of the first sensor element at 41. At 42, a second sensor signal is output from a second sensor element on the basis of the magnetic field that is dependent on the angle of rotation of the measurement object at the location of the second sensor element. The two sensor elements can be sensor elements of a differential angle sensor. The sensor elements can be Hall sensor elements or XMR sensor elements, for example. In particular in the case of Hall sensor elements, a 90° phase shift between the first and second sensor signals can be achieved by means of different spatial positioning of the two sensor elements. This means that such arrangements are particularly susceptible to mechanical misalignments.

During the calibration mode, a first offset value of the first sensor signal is ascertained at 43. Offset value in this case means a deviation from an ideal mean value of zero. The first offset value can be ascertained according to some exemplary embodiments on the basis of $$Off1 = 1/2(ADC1\_max + ADC1\_min),$$

where ADC1_max signifies a maximum value of the first sensor signal during the rotation and ADC1_min accordingly signifies a minimum value of the first sensor signal during the rotation. Ideally, that is to say when there is no mechanical misalignment, the first offset value Off1 would be zero. In practice, however, a value unequal to zero can be expected.

During the calibration mode, a second offset value of the second sensor signal is also ascertained at 44. The second offset value can be ascertained according to some exemplary embodiments on the basis of $$Off2 = 1/2(ADC2\_max + ADC2\_min),$$

where ADC2_max signifies a maximum value of the second sensor signal during the rotation and ADC2_min accordingly signifies a minimum value of the second sensor signal during the rotation. Ideally, that is to say when there is no mechanical misalignment, the second offset value Off1 would be zero. In practice, however, a value unequal to zero can be expected.

During the calibration mode, a gain or amplitude correction value is also ascertained on the basis of signal amplitudes of the first and second sensor signals at 45. The amplitude correction value can be ascertained according to some exemplary embodiments on the basis of $$mm = \frac{ADC1\_max - ADC1\_min}{ADC2\_max - ADC2\_min},$$

where (ADC1_max−ADC1_min) signifies the difference between the minimum and maximum of the first sensor signal, that is to say the signal amplitude thereof, and (ADC2_max−ADC2_min) signifies the difference between the minimum and maximum of the second sensor signal, that is to say the signal amplitude thereof. It is clear that the reciprocal of the above fraction could also be used as amplitude correction value, for example.

During the calibration mode, the first offset value Off1, the second offset value Off 2 and the amplitude correction value mm are stored for further use during normal operation at 46. Alternatively, the samples ADC1_max, ADC1_min, ADC2_max, ADC2_min could also be stored for further use during operation after the EoL calibration.

The normal operating mode of the angle sensor is indicated at 50 in FIG. 4. In the normal operating mode 50, rotations of the measurement object, which can be less than 360°, can be performed, for example over an angle range of just 90°, 120° or 180°. In this case, a corrected (rotation) angle estimation AE can be ascertained in the normal operating mode on the basis of the measured first and second sensor signals ADC1, ADC2, the stored first and second offset values Off1, Off2 and the stored amplitude correction value mm. According to some exemplary embodiments, the corrected angle AE can be estimated in the normal operating mode on the basis of $$AE = atan(ADC1-Off1; [ADC2-Off2]*mm),$$

where atan(.,.) signifies an arctangent operation, which can be implemented by means of the CORDIC (Coordinate Rotation Digital Computer) algorithm, for example.

Under normal operating conditions, that is to say in the normal operating mode, the angle sensor can read the compensation parameters Off1, Off2 and mm from a nonvolatile memory and apply them to currently measured samples ADC1, ADC2 of the first and second sensor signals in order to obtain a corrected angle estimate. Although the autocalibration step is performed over at least one full revolution (360°) during normal operation, rotations of under 360° can also be compensated for during operation. A typical angle range for chassis applications is rotations during normal operation of 90°, 120° or 180°, for example.

Exemplary embodiments thus propose an autocalibration function that stores gain and offset compensation parameters permanently and therefore allows an autocalibration with a special calibration mode that can be carried out as EoL calibration. On-chip calibration without an external reference is possible. Just one rotation of the measurement object is required, which delivers the maximum and minimum of the sensor signals. This can be achieved in every case with a 360° rotation of the measurement object or of the angle transmitter. In comparison with multipoint calibrations, considerable speeding-up of the calibration process can be achieved. Furthermore, less memory space may be sufficient, since only three or four compensation values now need to be stored in nonvolatile fashion.

Figure 5:
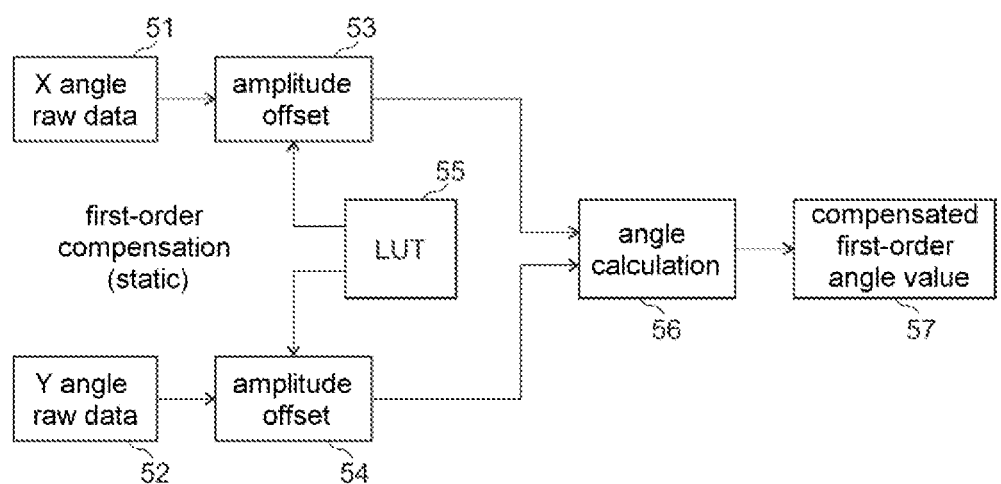
FIG. 5 shows a block diagram of an EoL autocalibration according to an exemplary embodiment.

A block diagram of an angle correction based on the described EoL autocalibration can be presented as in FIG. 5.

Raw data ADC1 from the first sensor element (e.g. x channel) that are obtained at 51 can be compensated for at 53, for example on the basis of x=(ADC1−Off1). Raw data ADC2 from the second sensor element (e.g. y channel) that are obtained at 52 can be compensated for at 54, for example on the basis of y=[ADC2−Off2]*mm. The compensation values Off1, Off2, mm can be read from a nonvolatile on-chip memory 55 for this purpose. At 56, the angle estimation takes place on the basis of AE=atan (x; y). A compensated first-order angle estimate is then output at 57.

Figure 6A:
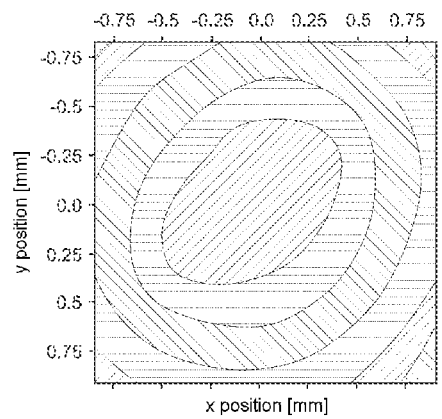
FIGS. 6A and 6B show a comparison of angle errors without and with EoL autocalibration.
Figure 6B:
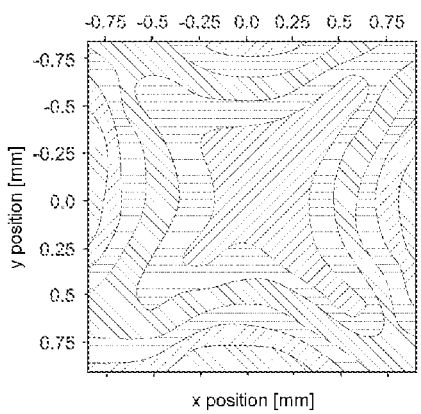

The performance of the proposed design can be assessed on the basis of a comparison of FIGS. 6A and 6B. FIG. 6A shows a typical sensor-magnet alignment for a chassis application as an initial situation. The minimum angle error AE is 0.39° in this case, and the maximum angle error for the entire scan matrix (within a +/−0.75 mm grid in the x and y directions) is 4.31°. The results presented in FIG. 6B are based on the same sensor raw data, but with an autocalibration according to an exemplary embodiment. The minimum angle error AE is reduced from 0.39° to 0.28°, while the maximum angle error AE is likewise significantly reduced from 4.31° to 2.04°. It can be seen that an improvement factor varies with an actual position of the sensor in relation to the magnet. Overall, however, a significant improvement can be achieved as compared with an estimation on the basis of only the raw signal data.

The EoL autocalibration described can also be combined with an additional multipoint calibration, according to some exemplary embodiments. This is explained on the basis of the schematic block diagram of FIG. 7.

Figure 7:
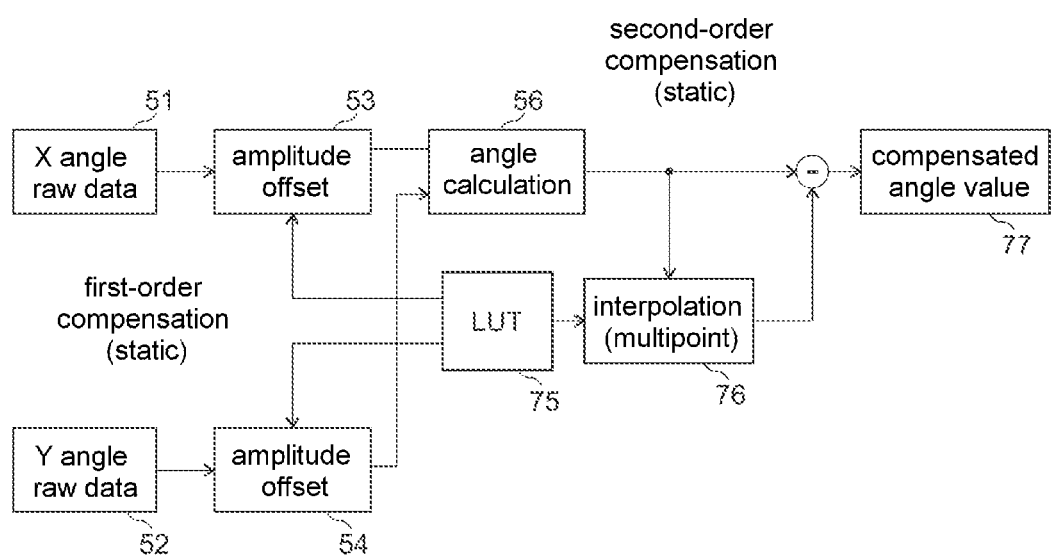
FIG. 7 shows a block diagram of an EoL autocalibration according to a further exemplary embodiment.

The design shown in FIG. 7 differs from FIG. 5 in that after the first-order angle estimation at 56 there is also a further second-order angle correction, which can improve the first-order angle estimate further by means of additionally stored multipoint calibration data. A first rotation angle estimation at 56 is thus based, as in FIG. 5, on the first and second first raw sensor signals 51, 52, the first and second offset values Off1, Off2 and the amplitude correction value mm, which are able to be read from the memory 75. A second rotation angle estimation at 77 is based on the first rotation angle estimation 56 and at least one stored angle correction value at 76 for a multipoint calibration performed during the calibration mode. A stored angle correction value can correspond to a difference between a known reference rotation angle (sample point) and the first rotation angle estimate at 56 that is also ascertained during the calibration mode. For each reference rotation angle headed for during the calibration mode, there can be an angle correction value stored. For example, the first-order angle estimation at 56 could have delivered an estimate of 9.6° for a known reference rotation angle of 10° during the calibration mode, resulting in an angle correction value of +0.4° that can be applied for a predetermined angle range around 10°. If the first-order angle estimation at 56 delivers an estimate of 11.2°, for example, during normal operation, this value can be corrected to 11.6° using the angle correction value of +0.4° during the second-order angle correction at 77.

To improve accuracy, it is also possible to interpolate between adjacent angle correction values in order to obtain a correction value that matches the first rotation angle estimate at 56. If an angle correction value of −0.4° was ascertained for a reference rotation angle of 20° during the calibration mode, for example, it is possible to interpolate between the associated angle correction values of +0.4 and −0.4 for first-order angle estimations of between 10° and 20° at 56. If the first-order angle estimation at 56 delivers an estimate of 14°, for example, during normal operation, this value can be corrected to 14.08° using an angle correction value of (0.6*0.4°−0.4*0.4°)=0.08°, accordingly interpolated between +0.4 and −0.4, during the second-order angle correction at 77.

To this end, a respective rotation angle estimation for the measurement object can be ascertained for predetermined (i.e. known) reference rotation angles (samples) beforehand during the calibration mode of the angle sensor on the basis of the first and second sensor signals ADC1, ADC2, the first and second offset values Off1, Off2 and the amplitude correction value mm, and a difference between respective rotation angle estimation and reference rotation angle can be stored as angle correction value.

Figure 8A:
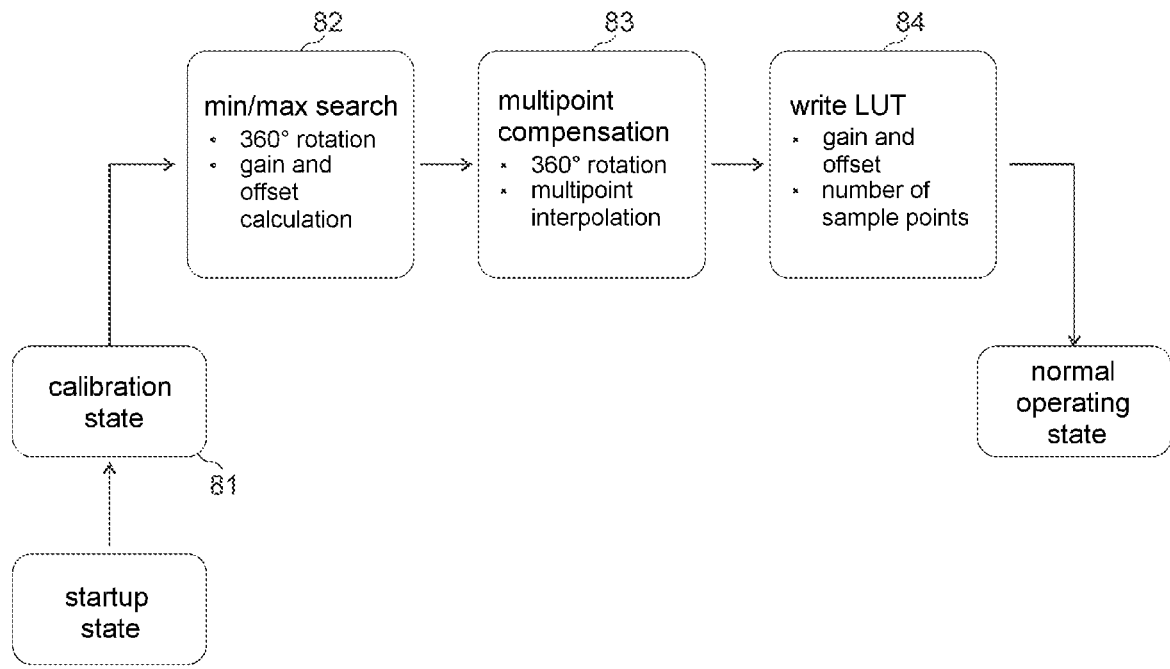
FIGS. 8A and 8B show block diagrams of calibration mode and operating mode according to exemplary embodiments.

Fundamentally, an apparatus according to the proposed design thus affords a dedicated calibration state that is accessible during a dedicated calibration operating mode. The calibration operating mode comprises the determination of the compensation parameters Off1, Off2 and mm that are needed for the first-order angle estimation. This is not intended as in-situ calibration during normal operation. As soon as the device is operational, a calibration state can be activated. Optionally, a multipoint calibration for the second-order angle estimation can also be performed in addition. A possible sequence is shown in FIG. 8A.

The method requires what is known as an end-of-line calibration option for the system integrator. As soon as the calibration state was activated at 81, a 360° rotation of a target shaft can be performed at 82. After the full revolution, the compensation parameters Off1, Off2 and mm can be calculated without an external ideal reference. If an external ideal reference is available, additional linearization concepts (e.g. multipoint calibration) can be applied at 83. A final step 84 is the storage of the compensation parameters Off1, Off2 and mm for the LUT.

Figure 8B:
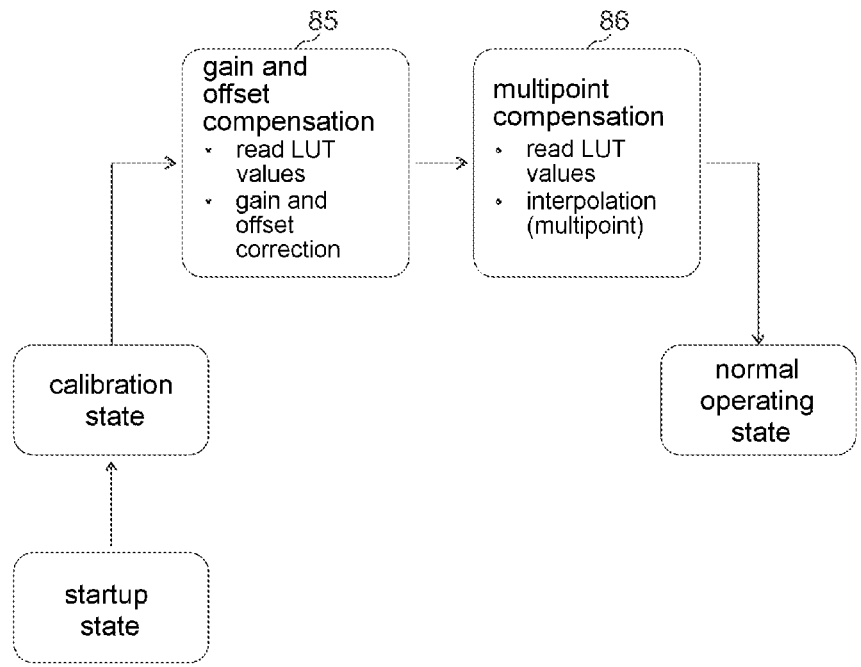

Under normal operating conditions (see FIG. 8B), the device can read the compensation parameters Off1, Off2 and mm from the LUT at 85 and perform a first-order autocompensation and, if necessary, at 86, additionally a second-order multipoint compensation.

Since both the autocalibration and, if need be, the multipoint calibration are available, exemplary embodiments can be used to afford a flexible compensation design according to the actual accuracy requirements.

Figure 9:
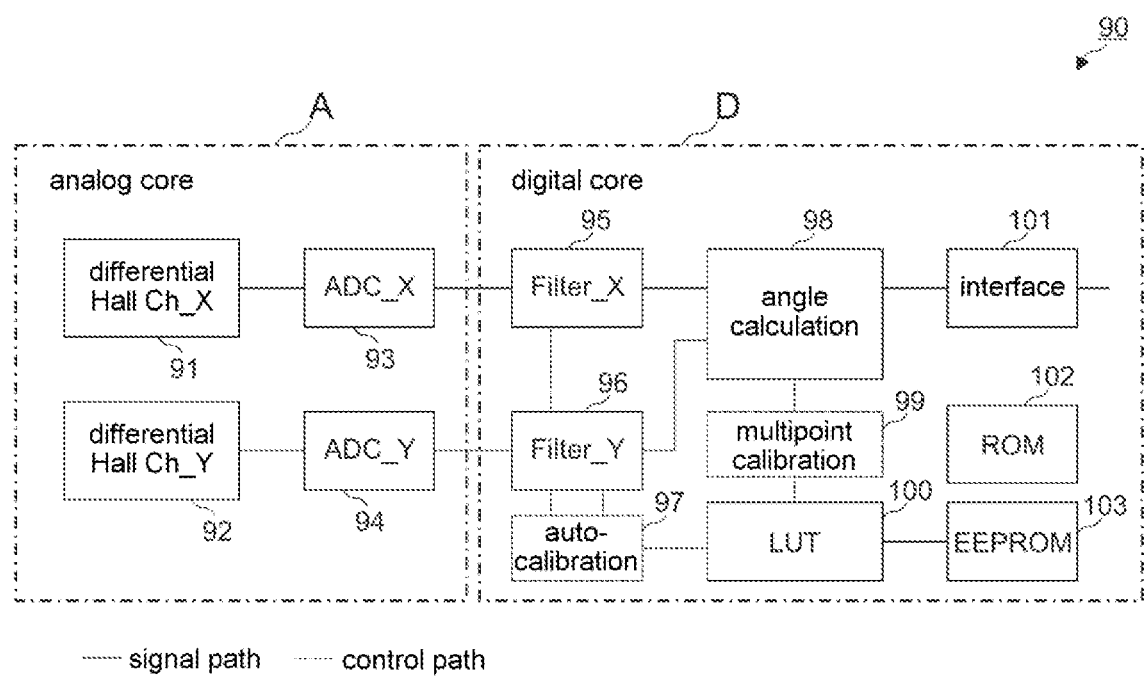
FIG. 9 shows a block diagram of an angle sensor IC according to an exemplary embodiment.

FIG. 9 shows a possible chip architecture for an angle sensor 90 according to an exemplary embodiment as a block diagram.

The chip comprises an analog section A and a digital section D. The analog section A comprises a first differential Hall plate 91 (x channel) and an ADC 93 connected downstream of the Hall plate 91. The analog section A further comprises a second differential Hall plate 92 (y channel) and an ADC 94 connected downstream of the Hall plate 92. The digital section D comprises a digital filter 95 coupled to the output of the ADC 93 and a digital filter 96 coupled to the output of the ADC 94. The digital filters 95, 96 can apply the compensation parameters Off1, Off2 and mm, stored by means of EEPROM 103 and LUT 100, to the x-channel and y-channel signals, in order to obtain, in an angle estimation processor 98, a first-order angle estimate that can be processed further to produce a second-order angle estimate by the angle estimation processor 98 using additional multipoint angle correction values from the LUT 100. The angle processor 98 can perform the angle calculation by means of a hardware- and/or software-based atan2 (or CORDIC) angle calculation. The angle estimates can then be transmitted to one or more external processors or control devices via an interface 101 (e.g. PSIS, PWM, SENT/SPC, UART).

Some advantages of the proposed EoL autocalibration, in which the compensation parameters are stored in an LUT permanently, are for example that no external reference is needed. Without an external reference, only a 360° rotation of the measurement object is required, but no highly accurate angular resolution transmitter. The calibration can take place more quickly, since no external post-processing (e.g. comparison with linear reference, calculation of sample points) is required. Also, significantly fewer compensation parameters need to be stored than in the case of a multipoint calibration. It is also possible for a higher level of automation to be achieved.

The proposed EoL autocalibration can be used for a sub–360° application. By way of example, direct installation of the sensor on the magnet and starting of the on-chip calibration for a 180° angle range is possible. The autocalibration works so long as a maximum and a minimum can be identified for x and y, or sine and cosine. The proposed design is not just restricted to compensating for gain and offset; it is fundamentally possible for all types of "autocalibration" to be used, depending on the calculation possibilities of the digital section of the chip. For example, this function can be used with a more complex chip-by-chip design, in which a powerful microcontroller is equipped with additional functions such as DFT analysis or other, more complex mathematical functions, and stored in the LUT. In the case of a chip with a charge pump, the user can start the calibration mode and the device can program itself after a 360° rotation.

The aspects and features that have been described together with one or more of the examples and figures described in detail above can also be combined with one or more of the other examples in order to replace an identical feature of the other example or in order additionally to introduce the feature into the other example.

Examples can furthermore be or relate to a computer program comprising a program code for carrying out one or more of the above methods when the computer program is executed on a computer or processor. Steps, operations or processes of various methods described above can be performed by programmed computers or processors. Examples can also cover program storage devices, e.g. digital data storage media, that are machine-, processor- or computer-readable and code machine-executable, processor-executable or computer-executable programs of instructions. The instructions carry out some or all of the steps of the methods described above or cause them to be carried out. The program storage devices can comprise or be e.g. digital memories, magnetic storage media such as, for example, magnetic disks and magnetic tapes, hard disk drives or optically readable digital data storage media. Further examples can also cover computers, processors or control units programmed to carry out the steps of the methods described above, or (field) programmable logic arrays (F)PLAs or (field) programmable gate arrays (F)PGAs programmed to carry out the steps of the methods described above.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A function block referred to as "means for . . . " carrying out a specific function can relate to a circuit configured for carrying out a specific function. Consequently, a "means for something" can be in the form of a "means configured for or suitable for something", e.g. a component or a circuit configured for or suitable for the respective task.

Functions of different elements shown in the figures, including those function blocks referred to as "means", "means for providing a signal", "means for generating a signal", etc., can be implemented in the form of dedicated hardware, e.g. "a signal provider", "a signal processing unit", "a processor", "a controller", etc., and as hardware capable of executing software in conjunction with associated software. When provided by a processor, the functions can be provided by a single dedicated processor, by a single shared processor or by a plurality of individual processors, some or all of which can be shared. However, the term "processor" or "controller" is far from being limited to hardware capable exclusively of executing software, but rather can encompass digital signal processor hardware (DSP hardware), network processors, application specific integrated circuits (ASICs), field programmable logic arrays (FPGAs), read only memory (ROM) for storing software, random access memory (RAM) and nonvolatile memory devices (storage). Other hardware, conventional and/or customized, can also be included.

A block diagram can illustrate for example a rough circuit diagram that implements the principles of the disclosure. In a similar manner, a flow diagram, a flowchart, a state transition diagram, a pseudo-code and the like can represent various processes, operations or steps that are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of said methods.

It goes without saying that the disclosure of multiple steps, processes, operations or functions disclosed in the description or the claims should not be interpreted as being in a specific order, unless this is explicitly or implicitly indicated otherwise, e.g. for technical reasons. The disclosure of multiple steps or functions therefore does not limit them to a specific order unless said steps or functions are not interchangeable for technical reasons. Furthermore, in some examples, an individual step, function, process or operation can include multiple partial steps, functions, processes or operations and/or be subdivided into them. Such partial steps can be included and be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. An angle sensor, comprising:
a first sensor element configured to output a first sensor signal on a basis of a magnetic field, which is dependent on an angle of rotation of a measurement object, at a location of the first sensor element;
a second sensor element configured to output a second sensor signal on a basis of the magnetic field, which is dependent on the angle of rotation of the measurement object, at the location of the second sensor element; and
at least one processor configured for a calibration mode of the angle sensor performed while the measurement object rotates,
wherein, during the calibration mode, the at least one processor is configured to determine a first offset value of the first sensor signal, determine a second offset value of the second sensor signal, determine an amplitude correction value on a basis of signal amplitudes of the first sensor signals and the second sensor signal, and store the first offset value, the second offset value, and the amplitude correction value in order to correct a rotation angle estimation measured in an operating mode of the angle sensor,
wherein the first and the second sensor signals ideally have a mean value of zero for a 360° rotation of the measurement object during the calibration mode, and
wherein the first and the second offset values indicate a respective actual mean-value deviation from zero.

2. The angle sensor as claimed in claim 1, wherein the at least one processor is configured to, during the calibration mode of the angle sensor, determine the first offset value, the second offset value, and the amplitude correction value for at least one 360° rotation of the measurement object.

3. The angle sensor as claimed claim 1, further comprising:
a nonvolatile memory configured to store the first offset value, the second offset value, and the amplitude correction value ascertained by the at least one processor during the calibration mode for an application in the operating mode.

4. The angle sensor as claimed in claim 1, wherein the first sensor element is sensitive to a first direction component of the magnetic field and the second sensor element is sensitive to a second direction component of the magnetic field, the second direction component being perpendicular to the first direction component.

5. The angle sensor as claimed in claim 1, wherein:
the first sensor element and the second sensor element are sensitive to a same direction component of the magnetic field, and
the first sensor element and the second sensor element are spaced apart from each other in order to impose a 90° phase shift between the first sensor signal and second sensor signals resultant from the locations of the first and the second sensor elements.

6. The angle sensor as claimed in claim 1, wherein the first and the second sensor elements are both magnetic field sensor elements.

7. The angle sensor as claimed in claim 1, wherein the amplitude correction value corresponds to a ratio of the signal amplitudes of the first and the second sensor signals.

8. The angle sensor as claimed in claim 1, wherein the angle sensor is integrated on a chip and the chip comprises a nonvolatile memory for storing the first offset value, the second offset value, and the amplitude correction value.

9. An angle sensor, comprising:
a first sensor element configured to output a first sensor signal on a basis of a magnetic field, which is dependent on an angle of rotation of a measurement object, at a location of the first sensor element;
a second sensor element configured to output a second sensor signal on a basis of the magnetic field, which is dependent on the angle of rotation of the measurement object, at the location of the second sensor element; and
at least one processor configured for a calibration mode of the angle sensor performed while the measurement object rotates,
wherein, during the calibration mode, the at least one processor is configured to determine a first offset value of the first sensor signal, determine a second offset value of the second sensor signal, determine an amplitude correction value on a basis of signal amplitudes of the first sensor signals and the second sensor signal, and store the first offset value, the second offset value, and the amplitude correction value in order to correct a rotation angle estimation measured in an operating mode of the angle sensor,
wherein, during the operating mode of the angle sensor, the at least one processor is configured to ascertain an angle of rotation, AE, of the measurement object AE, on the basis of:

$$AE = \operatorname{atan}(ADC1 - Off1; [ADC2 - Off2] * mm),$$

wherein ADC1 signifies the first sensor signal, ADC2 signifies the second sensor signal, Off1 signifies the first offset value, Off2 signifies the second offset value, and mm signifies the amplitude correction value.

10. The angle sensor as claimed in claim 9, wherein:
the at least one processor is configured so as, during the operating mode of the angle sensor, to ascertain the angle of rotation of the measurement object for rotations of the measurement object in a rotation angle range of less than 360°,
wherein to ascertain the angle of rotation of the measurement object for rotations of the measurement object in the rotation angle range of less than 360°, the at least one processor is configured to ascertain the angle of rotation based on the first sensor signal, the second sensor signal, the first offset value, the second offset value, and the amplitude correction value.

11. The angle sensor as claimed in claim 1, wherein:
the at least one processor is configured so as, during the operating mode of the angle sensor, for rotations of the measurement object in a rotation angle range of less than 360°, to ascertain an angle of rotation of the measurement object for rotations of the measurement object in a rotation angle range of less than 360°,
wherein to ascertain the angle of rotation of the measurement object for rotations of the measurement object in the rotation angle range of less than 360°, the at least one processor is configured to ascertain the angle of rotation based on the first sensor signal, the second sensor signal, the first offset value, and the second offset value.

12. The angle sensor as claimed in claim 1, wherein:
the at least one processor is configured so as, during the operating mode of the angle sensor, for rotations of the measurement object in a rotation angle range of less than 360°, to ascertain an angle of rotation of the measurement object for rotations of the measurement object in a rotation angle range of less than 360°,
wherein to ascertain the angle of rotation of the measurement object for rotations of the measurement object in the rotation angle range of less than 360°, the at least one processor is configured to ascertain the angle of rotation based on the first sensor signal, the second sensor signal, and the amplitude correction value.

13. An angle sensor, comprising:
a first sensor element configured to output a first sensor signal on a basis of a magnetic field, which is dependent on an angle of rotation of a measurement object, at a location of the first sensor element;
a second sensor element configured to output a second sensor signal on a basis of the magnetic field, which is dependent on the angle of rotation of the measurement object, at the location of the second sensor element; and
at least one processor configured for a calibration mode of the angle sensor performed while the measurement object rotates,
wherein, during the calibration mode, the at least one processor is configured to determine a first offset value of the first sensor signal, determine a second offset value of the second sensor signal, determine an amplitude correction value on a basis of signal amplitudes of the first sensor signals and the second sensor signal, and store the first offset value, the second offset value, and the amplitude correction value in order to correct a rotation angle estimation measured in an operating mode of the angle sensor,
wherein the at least one processor is configured so as, during the calibration mode of the angle sensor;
to ascertain, for a predetermined reference rotation angle, a respective rotation angle estimation for the measurement object on a basis of the first sensor signal, the second sensor signal, the first offset value, the second offset value, and the amplitude correction value, and
to store a difference between the respective rotation angle estimation and a reference rotation angle as an angle correction value used by the at least one processor to correct the rotation angle estimation measured in the operating mode of the angle sensor.

14. The angle sensor as claimed in claim 13, wherein the at least one processor is configured so as, during the operating mode of the angle sensor, for rotations of the measurement object in a rotation angle range of less than 360°:
to ascertain a first rotation angle estimation on a basis of the first sensor signal and the second sensor signal, the first offset value, the second offset value, and the amplitude correction value, and
to ascertain a second rotation angle estimation on a basis of the first rotation angle estimation and the angle correction value.

15. A method for operating an angle sensor, comprising:
outputting a first sensor signal from a first sensor element on a basis of a magnetic field at a location of the first sensor element, the first sensor signal being dependent on an angle of rotation of a measurement object;
outputting a second sensor signal from a second sensor element on a basis of the magnetic field at a location of the second sensor element, the second sensor signal being dependent on the angle of rotation of the measurement object; and
during a calibration mode of the angle sensor, in which the measurement object rotates:
determining a first offset value of the first sensor signal;
determining a second offset value of the second sensor signal;
determining an amplitude correction value on a basis of signal amplitudes of the first sensor signal and the second sensor signal;
storing the first offset value, the second offset value, and the amplitude correction value,
wherein the first and the second sensor signals ideally have a mean value of zero for a 360° rotation of the measurement object during the calibration mode, and
wherein the first and the second offset values indicate a respective actual mean-value deviation from zero; and
during an operating mode of the angle sensor, applying the first offset value, the second offset value, and the amplitude correction value to correct a rotation angle estimation of the measurement object.

16. The method as claimed in claim 15, further comprising:
performing the operating mode of the angle sensor in which rotations of the measurement object of less than 360° are performed, wherein during the operating mode, the method further comprises:
ascertaining the rotation angle estimation on a basis of the first sensor signal, the second sensor signal, the first offset value, the second offset value, and the amplitude correction value.

17. The method as claimed in claim 15, wherein, during the calibration mode of the angle sensor, the method further comprises:
ascertaining, for a predetermined reference rotation angle, a respective rotation angle estimation for the measurement object on a basis of the first sensor signal, the second sensor signal, the first offset value, the second offset value, and the amplitude correction value;

calculating a difference between the respective rotation angle estimation and a reference rotation angle; and storing the difference as an angle correction value for use during the operating mode.

18. The method as claimed in claim 17, wherein, during the operating mode of the angle sensor, for rotations of the measurement object in a rotation angle range of less than 360°, the method further comprises:

ascertaining a first rotation angle estimation on a basis of the first sensor signal, the second sensor signal, the first offset value, the second offset value, and the amplitude correction value; and ascertaining a second rotation angle estimation on a basis of the first rotation angle estimation and the stored angle correction value.

19. The method as claimed in one of claim 15, wherein:

the calibration mode is performed after installation of the angle sensor in an installation environment, and the angle sensor is operated in the operating mode after the calibration mode.

20. The angle sensor as claimed in claim 9, wherein:

the first and the second sensor signals ideally have a mean value of zero for a 360° rotation of the measurement object during the calibration mode, and the first and the second offset values indicate a respective actual mean-value deviation from zero.

* * * * *